(12) United States Patent
McIntyre et al.

(10) Patent No.: US 10,150,456 B2
(45) Date of Patent: Dec. 11, 2018

(54) APPARATUS AND METHOD TO DYNAMICALLY ADJUST ELECTRONIC BRAKING USING TPMS

(71) Applicant: Continental Automotive Systems, Inc., Auburn Hills, MI (US)

(72) Inventors: Matthew D McIntyre, New Baltimore, MI (US); Jean-Christophe Deniau, Fenton, MI (US); Brian J. Farrell, Troy, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 1 day.

(21) Appl. No.: 14/309,358

(22) Filed: Jun. 19, 2014

(65) Prior Publication Data
US 2015/0006051 A1    Jan. 1, 2015

Related U.S. Application Data

(60) Provisional application No. 61/840,680, filed on Jun. 28, 2013.

(51) Int. Cl.
| | |
|---|---|
| *B60T 8/17* | (2006.01) |
| *B60T 8/18* | (2006.01) |
| *B60T 11/10* | (2006.01) |
| *B60T 8/172* | (2006.01) |

(Continued)

(52) U.S. Cl.
CPC .......... *B60T 8/1708* (2013.01); *B60C 23/009* (2013.01); *B60C 23/0433* (2013.01); *B60C 23/0488* (2013.01); *B60T 8/1725* (2013.01); *B60T 8/1887* (2013.01); *B60T 11/108* (2013.01); *B60T 2240/06* (2013.01)

(58) Field of Classification Search
None
See application file for complete search history.

(56) References Cited

U.S. PATENT DOCUMENTS

| 5,749,984 A | 5/1998 | Frey et al. | |
|---|---|---|---|
| 2002/0121132 A1* | 9/2002 | Breed | B60C 11/24 73/146 |

(Continued)

FOREIGN PATENT DOCUMENTS

| DE | 102006033951 A1 | 10/2007 |
|---|---|---|
| DE | 102008028913 A1 | 12/2009 |

(Continued)

OTHER PUBLICATIONS

PCT/US2014/043365 International Search Report and the Written Opinion of the International Searching Authority dated Sep. 23, 2014.

(Continued)

*Primary Examiner* — Mussa A Shaawat
*Assistant Examiner* — Kyung J Kim

(57) ABSTRACT

The dynamic footprint of a tire is received and the dynamic footprint is determined by and received from a tire pressure monitoring (TPM) sensor. A weight or load of the secondary vehicle attached to the primary vehicle is calculated based at least in part on the footprint. Instructions to alter the operation of the braking system of the secondary vehicle based on the calculated weight or load are transmitted to the secondary vehicle.

18 Claims, 3 Drawing Sheets

(51) Int. Cl.
 *B60C 23/04* (2006.01)
 *B60C 23/00* (2006.01)

(56) References Cited

U.S. PATENT DOCUMENTS

| | | | | |
|---|---|---|---|---|
| 2003/0050743 | A1* | 3/2003 | Caretta | B60C 23/066 |
| | | | | 701/1 |
| 2006/0244581 | A1* | 11/2006 | Breed | B60C 23/0408 |
| | | | | 340/447 |
| 2008/0079237 | A1* | 4/2008 | Rubin | B62D 37/06 |
| | | | | 280/432 |
| 2010/0156667 | A1 | 6/2010 | Bennie et al. | |
| 2010/0292898 | A1 | 11/2010 | Stoehr | |

FOREIGN PATENT DOCUMENTS

| | | |
|---|---|---|
| JP | 61166757 A | 7/1986 |
| JP | 2012218682 A | 11/2012 |

OTHER PUBLICATIONS

Japan Patent Office Action dated Jan. 30, 2017 for corresponding Japanese application No. 2016-523812.

\* cited by examiner

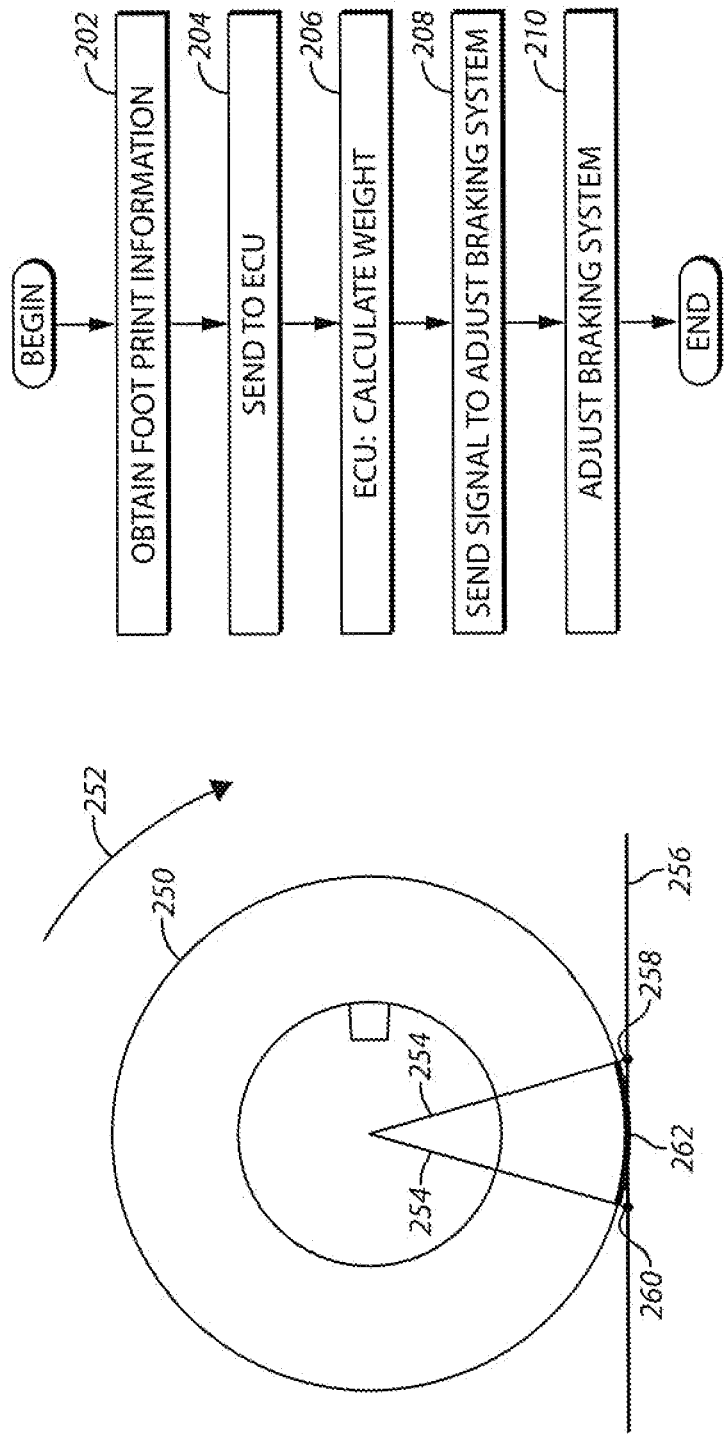

APPARATUS AND METHOD TO DYNAMICALLY ADJUST ELECTRONIC BRAKING USING TPMS

CROSS-REFERENCE TO RELATED APPLICATION

This patent claims benefit under 35 U.S.C. § 119 (e) to U.S. Provisional application No. 61/840,680, filed Jun. 28, 2013 and entitled "Method to Configure Electronic Braking using TPMS," the content of which is incorporated herein by reference in its entirety.

TECHNICAL FIELD

The present disclosure relates to vehicles and more particularly to electronic braking systems for automotive vehicles.

BACKGROUND OF THE INVENTION

Vehicles equipped with electronic braking systems can adjust the vehicle braking response to accommodate for various braking situations. When a vehicle has a trailer attached, the braking system of the trailer must be adjusted based on the weight of the trailer.

However, this adjustment is done manually by the operator. In most cases, the adjustment of the electric braking system for the trailer is a "hit or miss". If the weight of the trailer is not entered properly, then the effectiveness of the braking system is compromised, creating an unsafe driving condition.

The driver wants to ensure that the truck pulling the trailer does not slow down the trailer leading to over use, wear and tear of the truck braking system. On the other hand, the driver also wants to ensure that the trailer does not do all the breaking work leading to over use of the trailer braking system and possibly handling impacts on the truck. Additionally, if the load on the trailer is not centered the momentum of the area/side where the load is located will be greater thus requiring more brake power on that side.

Previous approaches have not proven adequate into addressing these problems. Consequently, some user dissatisfaction with previous approaches has arisen.

BRIEF DESCRIPTION OF THE DRAWINGS

The present disclosure will become more fully understood from the detailed description and the accompanying drawings, wherein:

FIG. 2 comprises a flowchart of one example of an approach for adjusting a brake system using a tire pressure monitoring system of the present invention according to various embodiments of the present invention;

Figure 1:
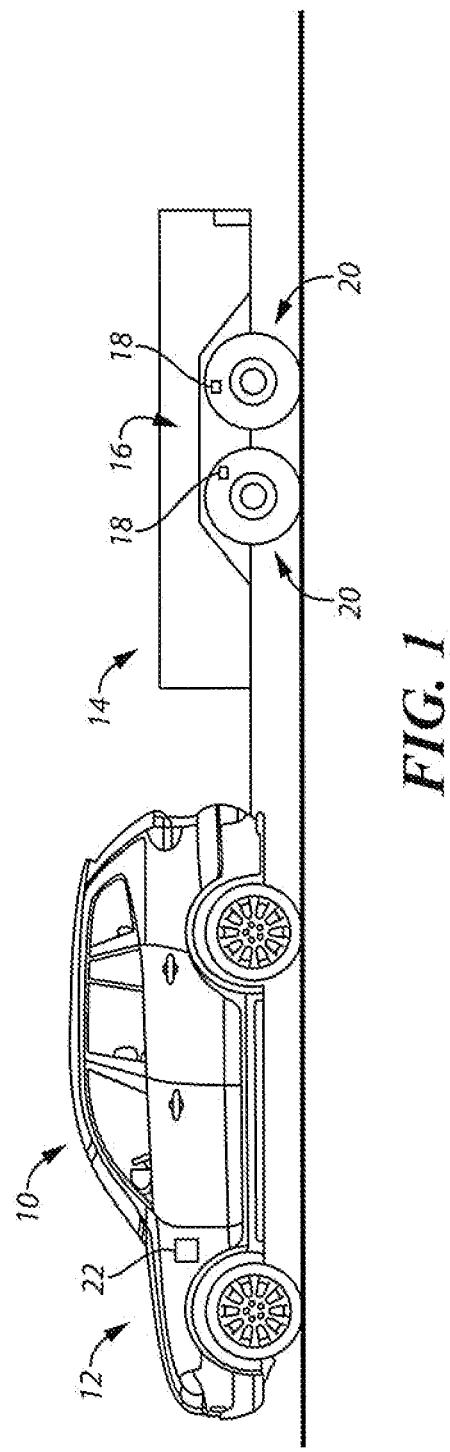
FIG. 1 comprises a schematic illustration of a vehicle with a tire pressure monitoring system of the present invention according to various embodiments of the present invention.

Skilled artisans will appreciate that elements in the figures are illustrated for simplicity and clarity. It will further be appreciated that certain actions and/or steps may be described or depicted in a particular order of occurrence while those skilled in the art will understand that such specificity with respect to sequence is not actually required. It will also be understood that the terms and expressions used herein have the ordinary meaning as is accorded to such terms and expressions with respect to their corresponding respective areas of inquiry and study except where specific meanings have otherwise been set forth herein.

DETAILED DESCRIPTION OF THE INVENTION

The following description is merely exemplary in nature and is in no way intended to limit the disclosure, its application, or uses. For purposes of clarity, the same reference numbers will be used in the drawings to identify similar elements.

FIG. 1 illustrates a vehicle 10 having an electric braking system 12. A trailer 14 is attached to the vehicle 10 and the braking system 12 may be alerted that a trailer 14 is attached. The trailer 14 also has its own trailer braking system 16. A tire pressure monitor (TPM) sensor 18 is located in each of the trailer wheels 20. The ECU 22 is capable of calculating a weight of the vehicle 10 based upon the footprint of the associated wheel 20 measured by the TPM sensor 18. An electronic control unit (ECU) 22 is associated with the vehicle braking system 12 or the trailer braking systems 16.

It will be appreciated that although the description presented herein is often with respect to a vehicle pulling a trailer, that the present approaches apply to any kind of primary vehicle pulling any type of secondary vehicle. That is, the primary vehicle can be any kind of motorized vehicle such as a passenger vehicle, while the secondary vehicle can be any type of non-motorized (or motorized) vehicle such as a trailer.

When a vehicle 10 has a trailer 14 attached, the braking system 16 of the trailer 14 must be adjusted based on the weight of the trailer 14. Trailer load may vary and the exact weight of the trailer 14 may be unknown to a vehicle operator.

The approaches described herein provide TPM sensors 18 and the TPM sensors 18 will be utilized to determine the footprint of the trailer tires and a vehicle ECU 22 calculate the load and will use this information to adjust the braking system 16. Some TPM sensors 18 have the capability to measure the footprint that the tire 20 in which it is installed is subjected. The footprint, along with other tire related information, such as pressure, temperature, and acceleration, are sent in one aspect via RF to the vehicle's ECU 22. The vehicle ECU 22 uses this information to calculate the load of each wheel and calculate the entire load of the trailer 14 and adjust the braking system 16 of the trailer 14.

Some TPM sensors 18, such as eTIS, have the capability to measure the footprint of the tire 20 in which it is installed. The footprint, along with other tire related information, such as pressure, temperature, and acceleration, are sent via RF to the vehicle's ECU 22.

Based on the information received from the sensors in the trailer, the ECU 22 of the vehicle will calculate the load of the trailer 14 per wheel 20, per axis, per tire or side, and overall and will use this information to adjust the trailer electric braking system to its optimal setting.

In one aspect and when the trailer 14 is attached, the vehicle 10 will be alerted that a trailer 14 is attached. For example, a screen on the Driver Information Center (DIC) may display the alert. In one aspect, the operator is given an opportunity to enter in a weight of the trailer 14.

Alternatively, the driver can skip entering the weight and let the ECU 22 in the vehicle 10 dynamically calculates in the weight of the trailer 14 during driving. The vehicle ECU 22 will calculate the trailer 14 weight and will adjust the braking system 16 while the vehicle 10 is in motion. This will ensure that the braking system 16 is correctly compensating for the weight of the trailer 14.

While the vehicle 10 is in motion, the TPM Sensors 18 in the trailer 14 will measure and transmit the footprint of the tire 20 it is installed in to the vehicle ECU 22.

Referring now to FIG. 2, one example of how the weight (load) of the trailer is calculated is described. To illustrate, a tire 250 rotates in the direction indicated by the arrow labeled 252. A radial line 254 extends from the sensor outward to the edge of the tire. As the tire rotates, the radial line touches pavement 256 at point 258 and then as the line 254 leaves pavement contacts the pavement at point 260.

More specifically, at step 202, the tire pressure sensor obtains foot print information and this will be eventually used to dynamically adjust the brake system of the trailer.

In these regards, it will be appreciated that:

Pressure=force/surface area, where pressure is the tire pressure, force is related to the weight of the trailer, and s is the surface area or footprint.

The tire pressure monitoring sensor rotates about the tire as discussed above. The sensor has two shock values during its rotational period. As the tire rotates, a first shock value of the sensor is taken as the TPMS sensor first "hits" the pavement at point 258. That is, an instantaneous value is measured when point 258 is reached. The second shock value is taken when the sensor leaves the pavement and this is when point 260 is reached. An arc 262 is formed and the length of the arc 262 is related to the footprint.

The two shock values (at points 258 and 260) are separated in time. This time represents a distance and a length of the tire. The sensor is configured to measure the time per rotation as well as the centripetal acceleration and gravity. It can be determined, for example, the distance of one tire rotation (e.g., 2 meters) and the time for this full rotation (e.g., 20 ms). It also can be measured by the TPM sensor that the two shock waves are collected 1 ms apart. Consequently, by simple comparison (knowing the overall length of the tire rotation) and in this example, the length of the arc is 10 cm and then the area of the arc (footprint) is the square of the arc length or, in this case, 100 cm$^2$.

At step 204, this footprint area information is sent to the ECU in the vehicle. This can be sent wirelessly, for example, via an RF signal.

At step 206 and with a known tire pressure and now the known area the equation mentioned above can be used and the force (or weight) of the trailer or on each tire is determined.

With the weight (load) known, the mass is also easily determined. Then, an actual braking force can be calculated. In one aspect, momentum can be defined as mass of the trailer times the velocity of the trailer. So, in one example, it may be desirable to go from a high value of momentum to 0 value of momentum. In these regards, the actual amount of braking force that is needed can be calculated. For example, if m=1500 kg, and speed=20 m/s. then momentum is 1500 kg times 20 m/s=30000 kg (m)/s. This is the actual amount of momentum needed to reduce the speed of the trailer to 0.

At step 208, a signal is sent to the trailer that adjusts the braking system. This may be the momentum value required to reduce the trailer speed to a certain value, or may be other scaled values.

At step 210, the braking units are adjusted accordingly. It will also be appreciated that the value calculated and transmitted by the ECU is used to adjust some other electrical and/or mechanical element which will actually apply the force and brake the trailer. For example, the value may adjust a voltage or may open or close a valve a certain distance to allow brake fluid to be applied to the brakes of the trailer.

The approaches described herein have one advantage that weights of the trailer (and braking forces used by the braking system) are constantly and automatically being recalculated in real time. As the speed changes (assuming the trailer has the same mass or weight), then the actual force used by the braking forces to stop or slow the trailer will change and this force value is constantly being updated no matter the speed of the vehicle. These approaches accommodate the changing amount of force that is needed to be applied. May be constantly recalculated at predetermined time intervals. The brake pedal can be used to determine the result desired. For example, depressing the pedal to a certain level may indicate that the driver wishes to decelerate the trailer from its current speed to zero. Other examples are possible.

Figure 3:
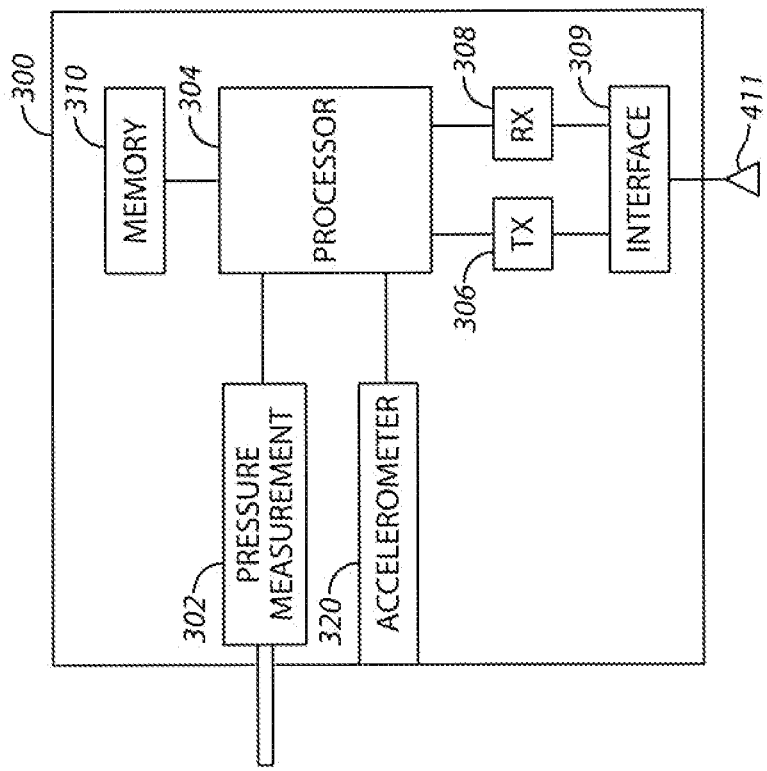
FIG. 3 comprises a block diagram of a tire pressure monitoring sensor that utilizes the approaches described herein according to various embodiments of the present invention.

Referring now to FIG. 3, one example of a sensor that utilizes the present approaches is described. The sensor 300 includes a pressure measurement device 302, a processor 304, a transmitter 306, a receiver 308 and an interface 309. A memory 310 may store computer instructions that are executed on the processor 304 to perform some of the approaches described herein. The TPMS sensor 300 measures the footprint as has been described above. The footprint information is sent to the ECU via the transmitter 306 through the interface 309 and an antenna 311. The ECU uses this information to constantly update braking information as described above. The sensor 300 also includes an accelerometer 320 (or other element capable of measuring shocks).

The interface 309 may perform any appropriate conversion functions and may be implemented as any appropriate combination of software or hardware. The transmitter 306 is configured to format and otherwise prepare signals for transmission and may include buffers or other components used for transmissions. The receiver 308 is configured to receive transmissions via antenna 311 through the interface 309. The pressure measurement device 302 obtains pressure information from a tire. The pressure measurement device 302 may also sense other parameters such as temperature.

Figure 4:
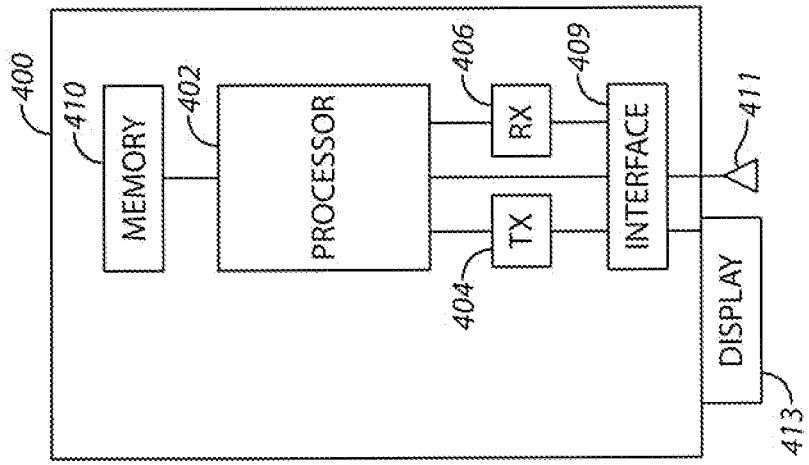
FIG. 4 comprises a block diagram of an electronic control unit (ECU) that utilizes the approaches described herein according to various embodiments of the present invention.

Referring now to FIG. 4, one example of an electronic control unit 400 in a vehicle is described. The ECU 400 includes a processor 402, a transmitter 404, a receiver 406, and an interface 409. The ECU 400 might drive a screen or display 413, where user alerts may be presented to a user. A memory 410 may store computer instructions that are executed on the processor 404 to perform some of the approaches described herein.

In operation, the ECU 400 receives information from the TPM sensor via antenna 411. The information is obtained by the processor 402 through interface 409 and receiver 406. The processor 402 then calculates a load. This can be used to determine how to alter the braking system. For example, if the driver decides to decelerate from 60 mph to 0, then the weight (or load) of the trailer may be determined and the force needed to accomplish the desired result is determined. Instructions as to how to alter the braking system are sent by the processor 402 through transmitter 404 and the interface 409 via the antenna 411 to the trailer. The braking system may be adjusted so that this force is applied.

The interface 409 may perform any appropriate conversion functions and may be implemented as any appropriate combination of software or hardware. The transmitter 406 is configured to format and otherwise prepare signals for transmission and may include buffers or other components used for transmissions. The receiver 406 is configured to receive transmissions via antenna 411 through the interface 409. The display 413 is any appropriate display that is viewable by a driver (or passenger) of the vehicle in which the ECU is disposed.

While the best modes for carrying out the invention have been described in detail the true scope of the disclosure should not be so limited, since those familiar with the art to which this invention relates will recognize various alternative designs and embodiments for practicing the invention within the scope of the appended claims.

What is claimed is:

1. A method of dynamically adjusting a braking system of a secondary vehicle being towed by a primary vehicle, the method comprising:
   receiving an area of the dynamic footprint of a tire, the area of the dynamic footprint being determined by and received from a tire pressure monitoring (TPM) sensor, the area being determined by measuring an elapsed time between:
   a. the occurrence of a first shock wave created and detected by the TPM sensor at a first instantaneous time impacting pavement on which the tire is traveling; and
   b. the occurrence of a second shock wave created and detected by the TPM sensor at a second instantaneous time leaving the pavement on which the tire is traveling, said shock waves being detected by an accelerometer in the TPM sensor;
   the area being determined by calculating the length of an arc travelled by the tire between the occurrences of the first and second shock waves and comparing the calculated length to an overall length of the tire rotation;
   receiving the measured pressure of the tire;
   calculating the weight or force of the secondary vehicle on the tire using the pressure and the area;
   calculating a mass from the calculated weight or force;
   using the mass, calculating at a processor a momentum value sufficient to change a speed of the secondary vehicle from a first value to a second value;
   transmitting instructions to alter the operation of the braking system based upon the momentum value;
   re-calculating the momentum value in real-time and at predetermined time intervals regardless of the speed of the secondary vehicle.

2. The method of claim 1 further comprising making an adjustment to the braking system of the secondary vehicle.

3. The method of claim 2 wherein the adjustment is changing a voltage or current.

4. The method of claim 2 wherein the adjustment is opening or closing a valve in the braking system in the secondary vehicle.

5. An electronic control unit (ECU) disposed in a primary vehicle and configured to communicate with a tire pressure monitoring (TPM) sensor in a secondary vehicle, the ECU comprising:
   an interface;
   a receiver coupled to the interface, the receiver configured to receive an area of the dynamic footprint of a tire, the dynamic area being determined by measuring an elapsed time between:
   a. the occurrence of a first shock wave created and detected by the TPM sensor at a first instantaneous time impacting pavement on which the tire is traveling; and
   b. the occurrence of a second shock wave created and detected by the TPM sensor at a second instantaneous time leaving the pavement on which the tire is traveling, said shock waves being detected by an accelerometer in the TPM sensor;
   the area being determined by calculating the length of an arc travelled by the tire between the occurrences of the first and second shock waves and comparing the calculated length to an overall length of the tire rotation;
   a transmitter coupled to the interface;
   a processor coupled to the interface, the processor configured to receive the area and the measured pressure of the tire, to calculate the weight or force of the secondary vehicle on the tire using the pressure and the area, and to calculate a mass from the calculated weight or force, the processor configured to, using the mass, calculate a momentum value sufficient to change a speed of the secondary vehicle from a first value to a second value, transmit instructions via the transmitter to alter the operation of the braking system based upon the momentum value, and re-calculate the momentum value in real-time and at predetermined time intervals regardless of the speed of the secondary vehicle.

6. The ECU of claim 5 wherein the adjustment is a change to a voltage or current.

7. The ECU of claim 5 wherein the adjustment is an opening or closing a valve in the braking system of the secondary vehicle.

8. A method of dynamically adjusting a braking system of a secondary vehicle being towed by a primary vehicle, the method comprising:
   determining an area of a dynamic footprint of a tire of a secondary vehicle that is attached to a primary vehicle, the dynamic area being determined by measuring an elapsed time between:
   a. the occurrence of a first shock wave created and detected by the TPM sensor at a first instantaneous time impacting pavement on which the tire is traveling; and
   b. the occurrence of a second shock wave created and detected by the TPM sensor at a second instantaneous time leaving the pavement on which the tire is traveling, said shock waves being detected by an accelerometer in the TPM sensor; and
   the area being determined by calculating the length of an arc travelled by the tire between the occurrences of the first and second shock waves and comparing the calculated length to an overall length of the tire rotation;
   transmitting the area of the dynamic footprint and a tire pressure to an electronic control unit, the electronic control unit responsively calculating the weight or force of the secondary vehicle on the tire using the tire pressure and the area, the electronic control unit calculating a mass from the calculated weight and force and using the mass to calculate a momentum value sufficient to change a speed of the secondary vehicle from a first value to a second value, transmitting instructions to alter the operation of the braking system based upon the momentum value, and re-calculating the momentum value in real-time and at predetermined time intervals regardless of the speed of the secondary vehicle.

9. The method of claim 8 further comprising making an adjustment to the braking system of the vehicle.

10. The method of claim 9 wherein the adjustment is changing a voltage or current.

11. The method of claim 9 wherein the adjustment is opening or closing a valve in the braking system of the secondary vehicle.

12. A tire pressure monitoring (TPM) sensor disposed in a secondary vehicle that communicates with an electronic control unit (ECU) disposed in a primary vehicle, the TPM comprising:
an interface;
a transmitter coupled to the interface;
a sensing apparatus for measuring tire pressure;
a processor coupled to the interface, the processor configured to determine an area of a dynamic footprint of a tire of the secondary vehicle based at least in part on the sensed readings of the sensing apparatus, the area being determined by measuring an elapsed time between:
a. the occurrence of a first shock wave created and detected by the TPM sensor at a first instantaneous time impacting pavement on which the tire is traveling; and
b. the occurrence of a second shock wave created and detected by the TPM sensor at a second instantaneous time leaving the pavement on which the tire is traveling, said shock waves being detected by an accelerometer in the TPM sensor;
the area being determined by calculating the length of an arc travelled by the tire between the occurrences of the first and second shock waves and comparing the calculated length to an overall length of the tire rotation;
the processor further configured to transmit the area of the dynamic footprint to the ECU via the transmitter, wherein the ECU receives the measured pressure of the tire and calculates a weight or force of the secondary vehicle on the tire using the pressure and the area, the ECU further configured to calculate a mass from the calculated weight or force, wherein the ECU using the mass, calculates a momentum value sufficient to change a speed of the secondary vehicle from a first value to a second value wherein the ECU transmits instructions to alter the operation of the braking system based upon the momentum value, and wherein the ECU re-calculates the momentum value in real-time and at predetermined time intervals regardless of the speed of the secondary vehicle.

13. The TPM sensor of claim 12 wherein the adjustment is a change to a voltage or current.

14. The TPM sensor of claim 12 wherein the adjustment is opening or closing a valve in the braking system of the secondary vehicle.

15. A non-transitory computer readable medium comprising computer executable instructions adapted to perform a method, the method comprising:
receiving an area of the dynamic footprint of a tire, the area of the dynamic footprint being determined by and received from a tire pressure monitoring (TPM) sensor, the area being determined by measuring an elapsed time between:
a. the occurrence of a first shock wave created and detected by the TPM sensor at a first instantaneous time impacting pavement on which the tire is traveling; and
b. the occurrence of a second shock wave created and detected by the TPM sensor at a second instantaneous time leaving the pavement on which the tire is traveling, said shock waves being detected by an accelerometer in the TPM sensor; and
the area being determined by calculating the length of an arc travelled by the tire between the occurrences of the first and second shock waves and comparing the calculated length to an overall length of the tire rotation;
receiving the measured pressure of the tire;
calculating the weight or force of the secondary vehicle on the tire using the pressure and the area;
calculating a mass from the calculated weight or force;
using the mass, calculating at a processor a momentum value sufficient to change a speed of the secondary vehicle from a first value to a second value;
transmitting instructions to alter the operation of the braking system based upon the momentum value;
re-calculating the momentum value in real-time and at predetermined time intervals regardless of the speed of the secondary vehicle.

16. The non-transitory computer readable medium of claim 15 wherein the method further comprises making an adjustment to the braking system of the vehicle.

17. The non-transitory computer readable medium of claim 16 wherein the adjustment is changing a voltage or current.

18. The non-transitory computer readable medium of claim 16 wherein the adjustment is opening or closing a valve in the braking system.

* * * * *